United States Patent
Hempel

(10) Patent No.: US 7,464,380 B1
(45) Date of Patent: Dec. 9, 2008

(54) EFFICIENT TASK MANAGEMENT IN SYMMETRIC MULTI-PROCESSOR SYSTEMS

(75) Inventor: Ronald J. Hempel, Inver Grove Heights, MN (US)

(73) Assignee: Unisys Corporation, Blue Bell, PA (US)

( * ) Notice: Subject to any disclaimer, the term of this patent is extended or adjusted under 35 U.S.C. 154(b) by 754 days.

(21) Appl. No.: 10/165,523

(22) Filed: Jun. 6, 2002

(51) Int. Cl.
G06F 9/46 (2006.01)
G06F 15/16 (2006.01)
H04N 7/173 (2006.01)

(52) U.S. Cl. ............... 718/102; 718/100; 718/104; 725/87; 709/231

(58) Field of Classification Search ......... 718/100–108; 725/87; 711/130; 709/231
See application file for complete search history.

(56) References Cited

U.S. PATENT DOCUMENTS

| | | | | |
|---|---|---|---|---|
| 5,784,614 | A * | 7/1998 | Davis | 718/102 |
| 5,872,972 | A * | 2/1999 | Boland et al. | 718/102 |
| 6,289,369 | B1 * | 9/2001 | Sundaresan | 718/103 |
| 6,490,725 | B2 * | 12/2002 | Kikinis | 725/87 |
| 6,769,017 | B1 * | 7/2004 | Bhat et al. | 709/214 |
| 6,839,808 | B2 * | 1/2005 | Gruner et al. | 711/130 |
| 6,993,762 | B1 * | 1/2006 | Pierre | 718/102 |
| 6,996,822 | B1 * | 2/2006 | Willen et al. | 718/102 |
| 7,096,271 | B1 * | 8/2006 | Omoigui et al. | 709/231 |

OTHER PUBLICATIONS

Sqillante et al., "Using Processor-Cache Affinity Information in Shared-Memory Multprocessor Scheduling", 1993, IEEE, pp. 131-143.*
Brecht, "An Experimental Evaluation of Processor Pool-Based Scheduling for Shared-Memory NUMA Multiprocessors", 1997, Springer-Verlag, Lecture Notes in Computer Science, vol. 1291, pp. 1-27.*
Zhou et al., "Processor Pool-Based Scheduling for Large-Scale NUMA Multiprocessors", 1991, ACM, pp. 133-142.*
Hamidzadeh, "Dynamic Task Scheduling Using One Optimization", IEEE, 2000, pp. 1151-1163.*

* cited by examiner

Primary Examiner—Meng-Ai An
Assistant Examiner—Jennifer N To
(74) Attorney, Agent, or Firm—Charles A. Johnson; Robert Marley; Nawrocki, Rooney & Sivertson PA

(57) ABSTRACT

A method of and apparatus for efficiently scheduling multiple instruction processors. The instruction processors are assigned to one of a plurality of clusters, such that the system ideally contains a plurality of clusters each having a plurality of instruction processors. Each cluster has a separate scheduling queue wherein the tasks for any one cluster have been selected to maximize cache memory hits by affinity scheduling. Instruction processors are scheduled from the scheduling queue associated with its assigned cluster whenever tasks remain within the cluster. Therefore, under normal system loading conditions, true affinity scheduling is accomplished providing maximum execution efficiency. However, whenever an instruction processor requests assignment and the associated cluster scheduling queue is empty, the instruction processor requests assignment of a task from another scheduling queue associated with a different cluster.

19 Claims, 5 Drawing Sheets

EFFICIENT TASK MANAGEMENT IN SYMMETRIC MULTI-PROCESSOR SYSTEMS

CROSS REFERENCE TO CO-PENDING APPLICATIONS

This application is related to commonly assigned and co-pending U.S. patent application Ser. No. 10/011,042, filed Oct. 19, 2001, and entitled "Operating System Scheduler/Dispatcher with Randomized Resource Allocation and User Manipulable Weightings"; U.S. patent application Ser. No. 10/028,256, filed Jun. 6, 2002, and entitled "Allocation and Provisioning on Quadrature Amplitude Modulators (QAM) for Optimal Resource Utilization in a Cable Company's Head End for a Delivery of Content on Demand Environment"; U.S. patent application Ser. No. 09/750,947, filed Dec. 28, 2000, and entitled "Video on Demand Bandwidth Allocation Algorithm for an HFC (DVB-ASI) Network"; U.S. patent application Ser. No. 09/304,907, filed May 4, 1999, and entitled "Video on Demand Transaction Server"; U.S. patent application Ser. No. 09/304,906, filed May 4, 1999, and entitled "Video Server"; U.S. patent application Ser. No. 08/507,872, filed May 15, 2000, and entitled "Set Top Network Protocol"; U.S. patent application Ser. No. 09/304,908, filed May 4, 1999, and entitled "Video On Demand System"; U.S. patent application Ser. No. 09/507,700, filed May 15, 2000, and entitled "Menuing Application for Video On Demand System"; U.S. patent application Ser. No. 09/714,072, filed May 5, 1999, and entitled "Video on Demand Video Server"; U.S. patent application Ser. No. 09/304,907, filed May 5, 1999, and entitled "Video on Demand Transaction Gateway"; and U.S. patent application Ser. No. 09/400,647, filed Sep. 21, 1999, and entitled "A Web Based Video on Demand Administration Application", all of which are incorporated by reference.

BACKGROUND OF THE INVENTION

1. Field of the Invention

The present invention generally relates to efficient management of multiple instruction processors within a data processing environment and more particularly relates to scheduling of processing resources for the delivery of user selected video information to subscribing users.

2. Description of the Prior Art

It has been known for some time to employ multiple instruction processors within a single data processing system. Unless these instruction processors are dedicated to specific tasks (a very special purpose system architecture having limited utility), each of these instruction processors need to be assigned tasks from a common pool of tasks which much be accomplished. As the number of instruction processors becomes relatively large, the scheduling resources (e.g., scheduling script and common tasking data) can become so overloaded as to actually slow through-put of a system with the addition of instruction processors, because there is a problem in efficient scheduling of tasks.

Most modern instruction processors now employ some sort of cache memory to better match the internal speed within the instruction processor with the time it requires to access the instructions and data stored within memory. This generally takes the form of a hierarchy of cache memory subsystems wherein at least a portion of the cache memory is dedicated to an individual instruction processor. It is known in the art that the execution speed of a given instruction processor is maximized whenever the needed instructions and data are stored within the dedicated cache memory, generating a cache memory "hit". Any cache memory "miss" (i.e., request for instruction(s) or data not currently found within cache memory) tends to slow execution as the required instruction(s) and/or data must be fetched from a larger and slower memory subsystem.

Thus, it is desirable to schedule like tasks to like instruction processors to improve execution efficiency by maximizing cache "hits". If a given instruction processor only performs highly related tasks, virtually all execution will occur using the current cache memory contents without generating any cache "misses". An "ideal" scheduler would always assign a given task (and highly related tasks) to the same instruction processor. This scheduling approach attempts to maximize instruction processor affinity. A problem with this approach is that the amount of logic to implement it tends to be unwieldy. Furthermore, restricting certain tasks to certain instruction processors produces difficulties with unbalanced loading of system resources. At any one instant, a limited number of instruction processor may be dedicated to execution of most of the total system load.

Therefore, it can be seen that employing the instruction processor affinity approach tends to maximized the execution efficiency of an individual instruction processor with a tendency to reduce over all system efficiency. However, more randomized scheduling, which improves equality of system loading, tends to reduce the execution efficiency of individual instruction processors.

An alternative approach is to use partitioned application systems. This solution employs two (or more) separate systems executing against the same database using a lock box to control access to the database. This allows more instruction processors to be allocated to the processing of a single application, albeit partitioned. This solution tends to be much more costly because a separate hardware component and dedicated software are required to maintain the Database integrity. The costs also are increased due to the additional processing overhead managing the system and database locks required to preserve the database integrity reducing the throughput of existing systems.

SUMMARY OF THE INVENTION

The present invention overcomes many of the disadvantages found within the prior art by providing a technique for scheduling execution of multiple tasks with multiple instruction processors within a multi-processor environment. The invention provides a software algorithm that has a mechanism to allow a computer system having a large number of instruction processors, divided into a number of "clusters", to schedule any task available that is to be executed system wide. This new algorithm minimizes cache misses by implementing a switching queue for each cluster. A cluster can be configured from one instruction processor to the maximum number of instruction processors in the application. By allowing multiple switching queues, interference from other instruction processors in the application is significantly reduced.

If a cluster has no activities to schedule for the instruction processors within that cluster, it will then investigate whether other clusters have tasks available that are waiting to execute. If there are tasks waiting, the available cluster takes on the surplus task(s) and executes the task(s). By allowing the switching queues to be configurable, a site administrator can optimize performance tailored to their particular environment. This switching queue will significantly reduce cache misses and increase throughput by minimizing cache interference.

In accordance with the present invention, an application program which is started is placed into a dispatching queue. This dispatching queue is where an instruction processor goes to find a new task to execute. The two key functions that need to be accomplished are putting the task onto the queue and taking task off the queue. With this new algorithm these two functions are retained but are changed in the following way. Instead of having a single switching queue, there is a separate queue for each cluster. A cluster is a grouping of instruction processors that can be based on a single instruction processor or it can be all instruction processors in the application, as in the prior art. An application is defined as a software package, which is composed of multiple programs, such as a Billing Application, Reservation Application, etc. A partition is defined as a set of hardware components that are controlled and managed by a single copy of the Operating System.

For the preferred mode of the present invention, there are 16 total instruction processors with a cluster size of four instruction processor per cluster. By the previous definition, this system will have four switching queues. Tasks are initially placed onto the four switching queues in a simple round robin approach. The first task is placed onto the switching queue for cluster 0, the second on cluster 1, etc. The fourth task is placed on cluster 3, and then the next task "(i.e., number 5), is placed on cluster 0 queue. This strategy will load balance the system by distributing programs over the available switching queues, which will in turn balance the load on the available instruction processors. Initially, this is similar to affinity dispatching, or activity/program dedication, but much more flexible, and providing automatic load leveling.

Now when a and instruction processor needs to execute a task it will request a task from the queue associated with the cluster containing that instruction processor. This will increase performance by reducing the number of instruction processors accessing the switching queue, and also increase the cache hit rate by retaining some residual data in the cache because of the affinity attribute inherent in the assignment to "applications". In the preferred mode, there are four clusters each with a separate and dedicated dispatching queue. The tasks or programs that are executed tend to reside within a cluster for the whole time that they are executing, reducing cache misses, and reducing the burden on the backing memory system.

The prior art systems have the overhead problem of balancing the system while trying to retain affinity. The approach of the present invention automatically levels the system in the following way. When an instruction processor in a cluster needs to find a new task to execute, it references its cluster's associated queue. If it finds a task to execute, it so proceeds. In the case where there is not a task to execute, it looks at the switching queue in the next cluster for a task to execute. If it finds a task, the task is reassigned to the cluster containing the available instruction processor. The next time, the cluster again checks its cluster's queue for a task to execute. If the cluster does not find a task to execute, it again looks at he switching queue in the next cluster. This will be done in a round robin fashion once again, thus automatically leveling the system without any specific code designed to do so. This mechanism produces an environment wherein each instruction processor tends to stay within its own cluster when the system gets busy. When the system is relatively idle, the instruction processors will tend to compete for work. This produces a greater number of cache misses and instruction processor degradation, but as the workload grows, the system will become more efficient, while being balanced automatically.

The algorithm of the present invention allows and supports any task to execute on any processor in a tightly coupled system. Typically, other systems will lose processing power as instruction processors are added if they support a single copy of the operating system due to cache interference. This reduces the effectiveness of systems and limits the number of processors in a system. With the algorithm of the present invention, a single system can effectively deploy a large number of processors against a single application within a single system.

The preferred mode of the present invention employs the technique of the present invention within a video on demand system. It is precisely such a system wherein a large number of instruction processors is required to provide each of the subscribing users with a individual presentation of a selected video program.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
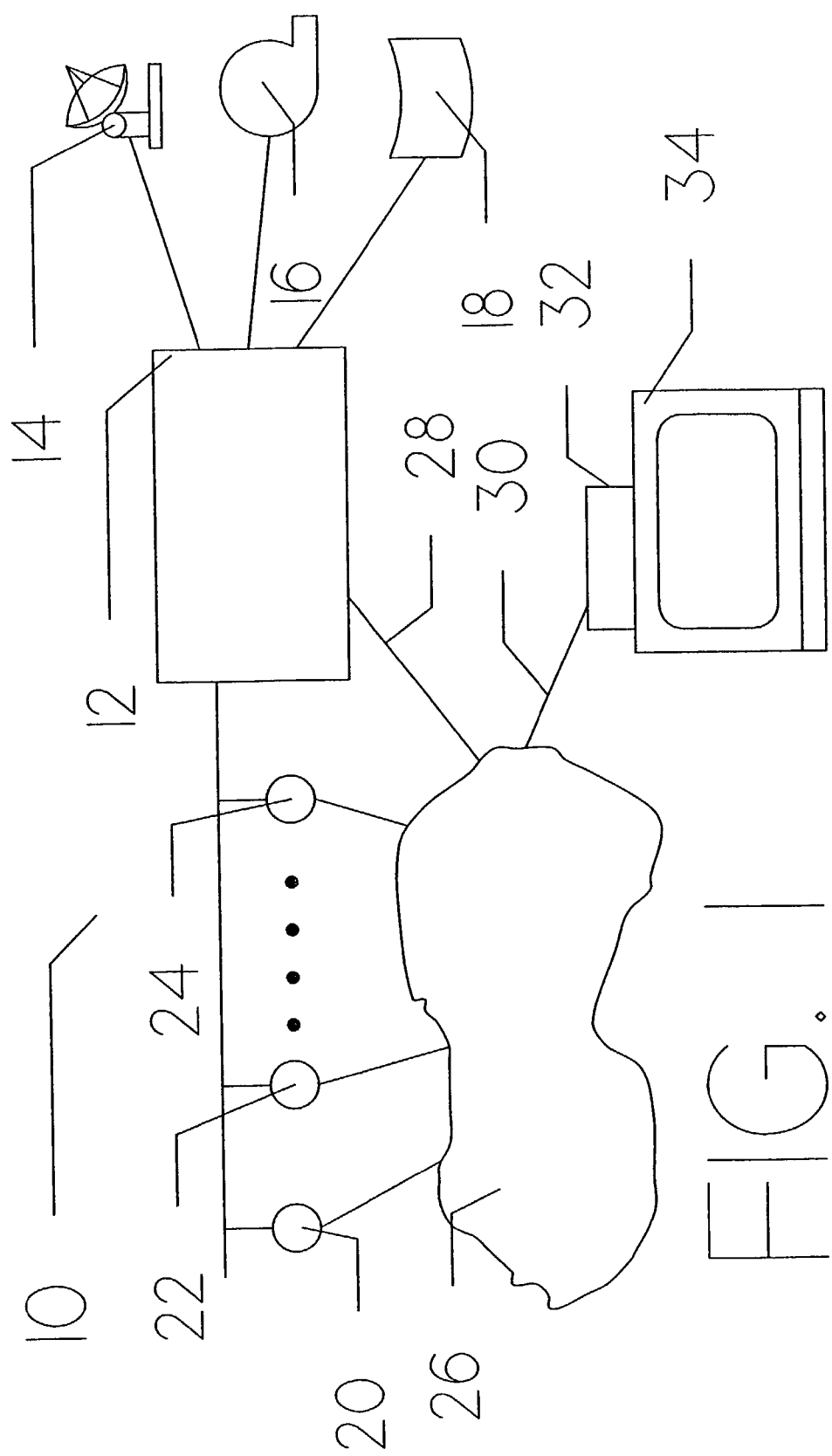
FIG. 1 is a schematic diagram showing the operation of the overall video on demand system which corresponds to the preferred mode of practicing the present invention.

FIG. 1 is a schematic diagram 10 showing the overall video on demand system employing the scheduling approach of the present invention. A subscribing user (not shown) is positioned adjacent standard television receiver 34. Through this television receiver, the user is capable of viewing video programming material transferred to his location via coaxial cable 30 from network 26 in the fashion currently known in the cable television industry. The interface between coaxial cable 30 and standard television receiver 34 is provided by set top subscriber box 32, which provides the conversion between MPEG-2 digitized video format and the analog video signal required by television receiver 34.

In many respects, set top subscriber box 32 is similar to the set top subscriber boxes utilized with existing cable television systems with the slight functional differences described in more detail below. The basic reason for these slight differences is to permit a subscribing user to communicate with transaction server 12 in a two directional manner. Not only does set top subscriber box 32 receive video programming data via coaxial cable 30 and present it to television receiver 34, but set top subscriber box 32 is capable of transferring user requests via coaxial cable 30 and network 26 to transaction server 12 via path 28. The most important requests in accordance with the present invention are those which initiate and control the individualized video on demand programming.

When the user is interested in viewing a particular video program, a request is made from set top subscriber box 32 and transferred to transaction server 12 via coaxial cable 30, network 26, and path 28. Transaction server 12, a Unisys 2200 system in the preferred embodiment, is provided access to video programming information from satellite receiver 14, from analog video storage 16 and digital mass storage 18. In each instance, the video programming data is either received in digital form or converted to digital form. According to the preferred embodiment of the present invention, the MPEG-2 standardized format is utilized.

Whenever a request is received, transaction server 12 checks various security parameters, makes appropriate subscriber billing entries, and generally performs all of the necessary administrative functions as described below in greater detail. Additionally, transaction server 12 stores digital video data for transmission by the video server assigned to the requesting subscriber. One of video server platforms 20, 22, . . . , or 24 is assigned the task by transaction server 12 and the stored digital video data is supplied via the digital data bus shown in accordance with the scheduling algorithm of the present invention. In the preferred mode of the present invention, each video server platform is a separate industry compatible, Windows NT based, computer platform. Once transferred to the selected video server, the requested video programming is transmitted via network 26 and coaxial cable 30 to set top subscriber box 32 and television receiver 34.

Figure 2:
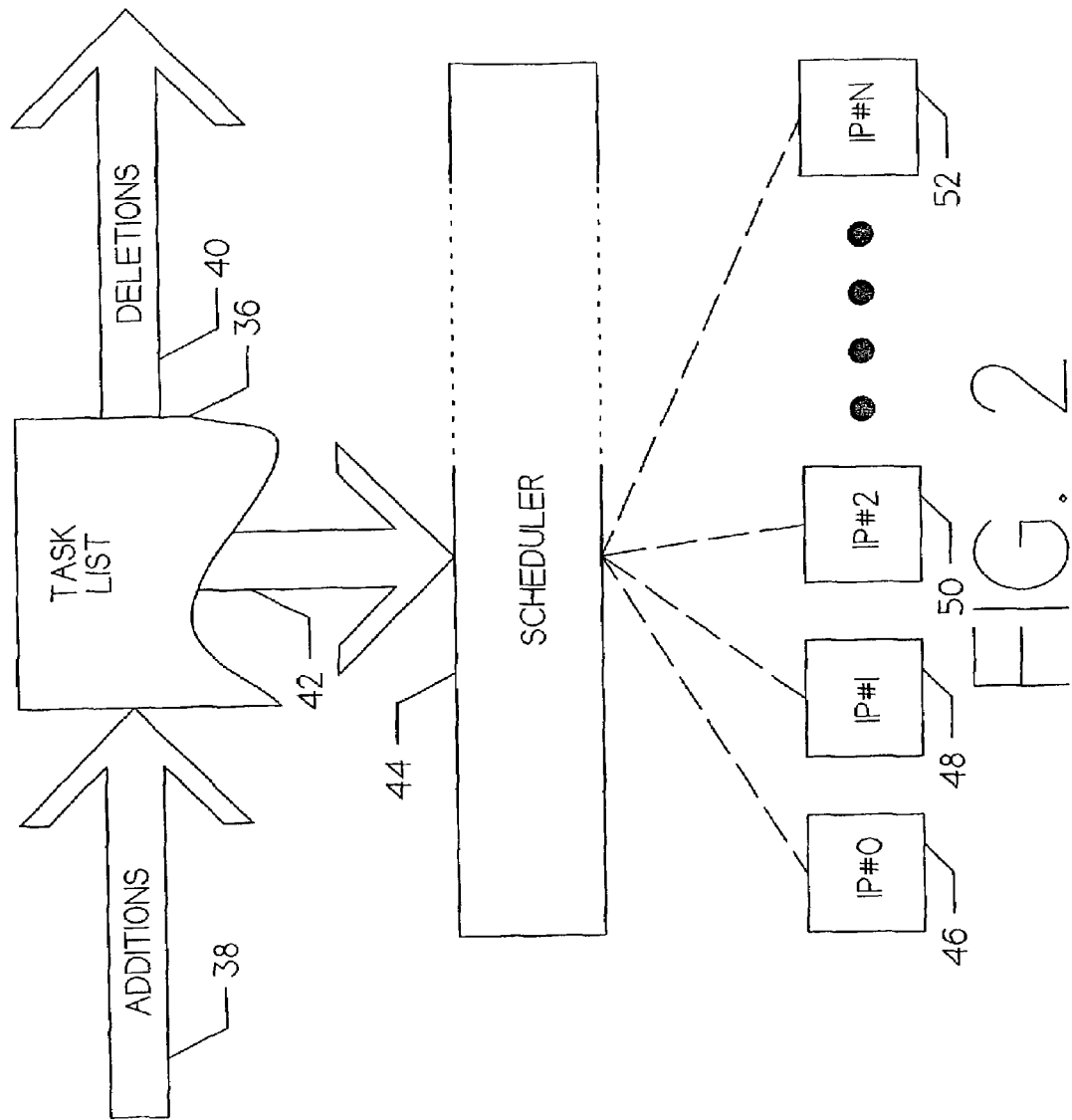
FIG. 2 is a schematic diagram showing basic round robin scheduling of multiple tasks within a multiple instruction processor environment.

FIG. 2 is a schematic diagram showing the typical environment in which multiple instruction processors are scheduled to execute multiple software tasks. Task list 36 contains the complete list of all software tasks which are currently ready for execution. Tasks are added at element 38 as timing and other conditions indicate execution readiness. Tasks are deleted from task list 36 as shown by element 40.

Scheduler 44 utilizes its internal algorithms to assign the various active tasks from task list 36 to the individual instruction processors, IP#0 46, IP#1 49, IP#2 50 . . . IP#N 52. In accordance with standard "round robin" techniques, this usually takes the form of assigning the next available task to the next available instruction processor. As a result, whenever IP#0 46 has no current task for execution, it requests assignment of a task from scheduler 44. Scheduler 33 removes the next task from the queue of task list 36 through pathway 42 and assigns that task to IP#0 46. Further assignments are made in a similar manner to the extent that tasks tend to be assigned to instruction processors in a nearly random fashion.

Figure 3:
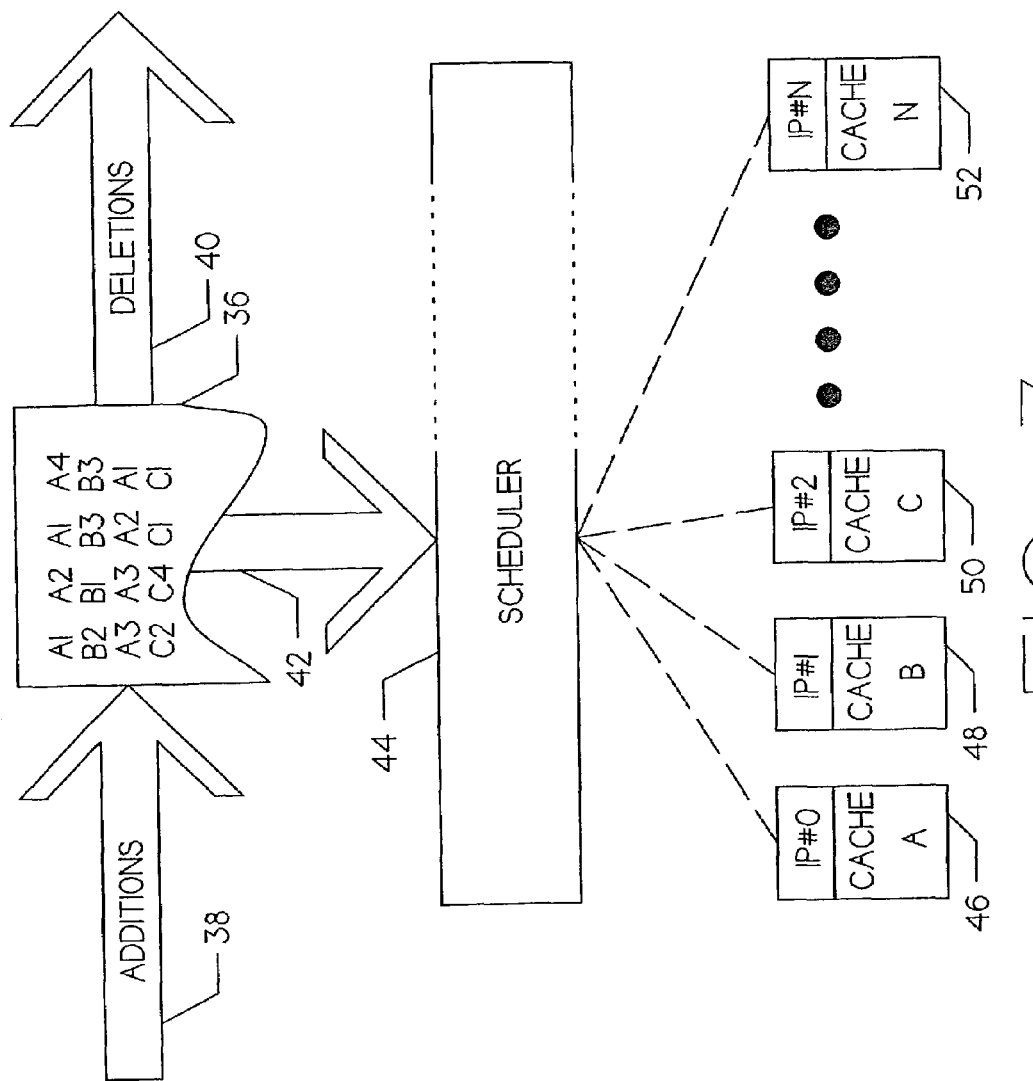
FIG. 3 is a schematic diagram showing the impact of dedicated cache memory on the efficiency of scheduled execution.

FIG. 3 is a detailed schematic diagram, similar to that of FIG. 2, showing the effect of adding a dedicated cache memory to each of the instruction processors. IP#0 46 has dedicated cache memory Cache A. IP#1 48 has dedicated Cache B. IP#2 50 and IP#N 52 contain cache memories Cache C and N, respectively. As is known in the prior art, each of these cache memories (i.e., Cache A, B, C, and N) have substantially less storage space than the main storage memory (not shown). Therefore, whenever the instructions and data required by an instruction processor are contained within its dedicated cache memory (i.e., cache hit), the execution proceeds at a rapid rate. Whenever the required instructions and data are not located within the dedicated cache memory (i.e., cache miss), execution is delayed awaiting the reference(s) to main memory.

Therefore, whenever scheduler 44 assigns a task from task list 36 to a given instruction processor which is highly related (i.e., references a substantial number of the same instructions and data) to the most immediate previous task, execution efficiency of that instruction processor is enhanced. For example, assuming that A1, A2, A3, and A4 are highly related tasks, assigning them to a single instruction processor would greatly improve execution efficiency.

Figure 4:
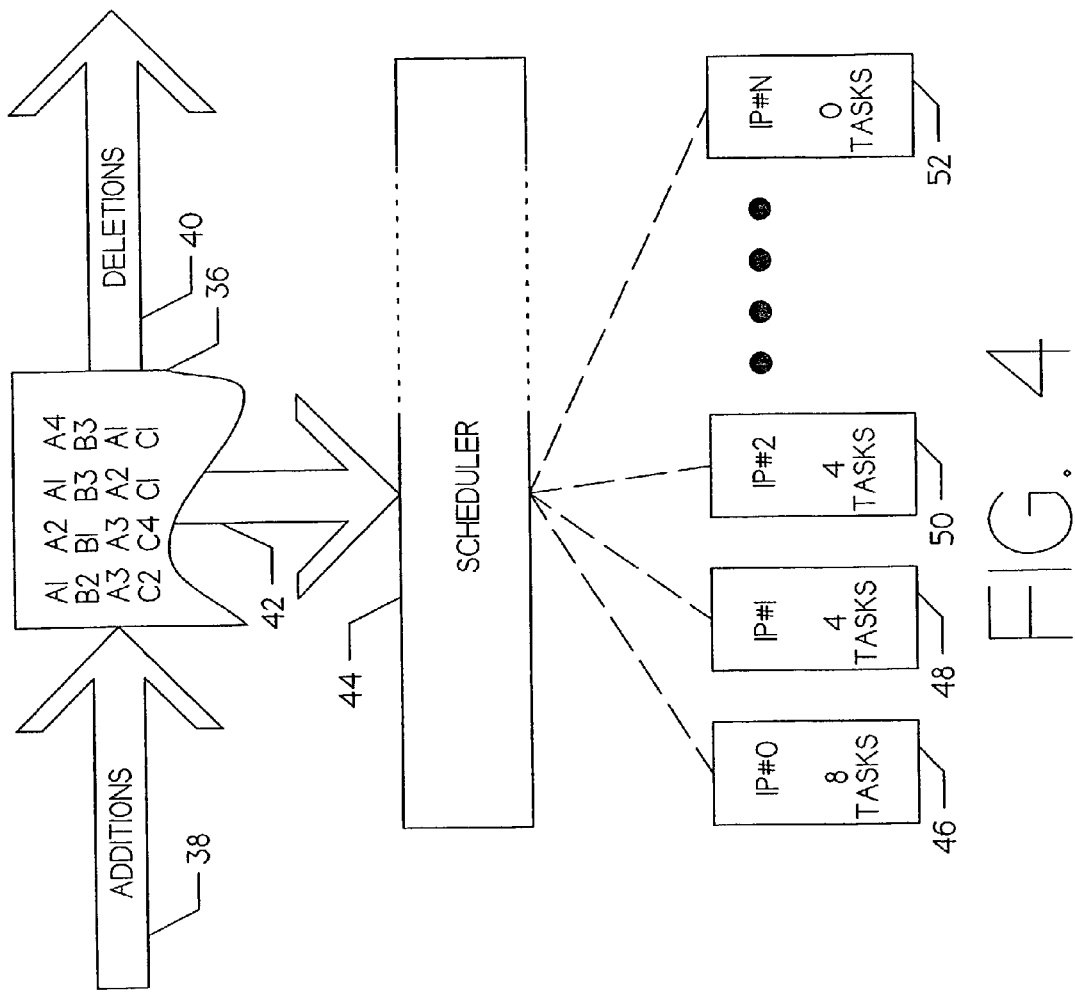
FIG. 4 is a schematic diagram showing the negative impact of affinity scheduling on system balance.

FIG. 4 is a detailed schematic diagram, similar to FIG. 2 and FIG. 3, which shows the major difficulty of "affinity" scheduling. This is a technique wherein individual instruction processor execution efficiency is improved by always assigning highly related tasks to instruction processors. As a result, tasks tend to be assigned in such a fashion that loading on individual instruction processors becomes very unbalanced.

In the illustrated example, all "A" tasks from task list 36 (i.e., A1, A2, A3, and A4) are assigned to IP#0 46. Similarly, all "B" tasks (i.e., B1, B2, and B3) are assigned to IP#1 48. In keeping with this approach, all "C" tasks (i.e., C1, C2, and C4) are assigned to IP#2 50.

It is apparent that such affinity scheduling has caused substantial imbalance in system loading. IP#0 46 has eight tasks assigned. During the same time period, IP#1 48 and IP#2 50 each have only four tasks assigned. Most apparent, IP#N 52 has no tasks assigned and remains idle. This system imbalance causes substantial execution delays because of such inefficient utilization of resources.

Figure 5:
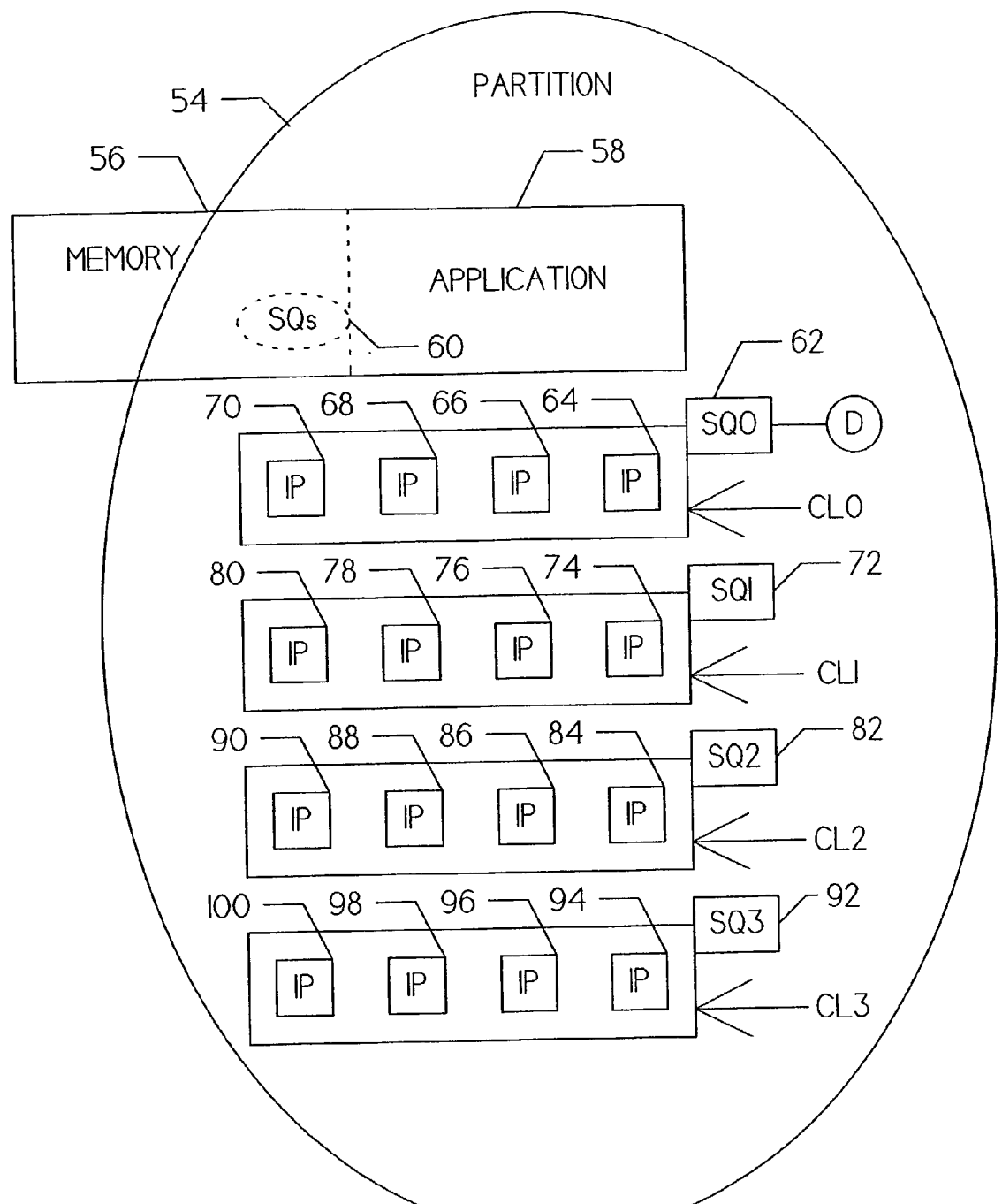
FIG. 5 is a detailed schematic diagram showing task scheduling in accordance with the present invention.

FIG. 5 is a detailed schematic diagram showing task scheduling in accordance with the present invention. As stated above, the preferred mode of practicing the present invention involves a plurality of video servers (i.e., instruction processors) which provide video streaming of requested video programming material. In the example shown, Instruction Processors 64, 66, 68, and 70 are assigned to cluster 0 utilizing scheduling queue 62. Cluster 1 utilizes scheduling queue 72 and contains Instruction Processors 74, 76, 78, and 80. Similarly, cluster 2, containing Instruction Processors 84, 86, 88, and 90, are scheduled by scheduling queue 82. Finally, Instruction Processors 94, 96, 98, and 100 are contained within cluster 3 and scheduled by scheduling queue 92.

Scheduling queues 62, 72, 82, and 92 are each functionally and schematically located within the associated cluster. However, all four are physically located with in memory 56 at location 60. Application 58 drives the scheduling and requirement for assignment of tasks. All of these elements are located within the single partition 54.

During operation, each task ready for execution is sent by application 58 to one of the four clusters. This is accomplished on a strict affinity basis to enhance execution efficiency through maximization of cache hits. The receiving one of the four clusters enters it into its associated scheduling queue. Thus, during operation, each of the four scheduling queues contains an ordered set (i.e., LIFO) of requests for execution of highly related tasks.

Whenever one of the instruction processors becomes available for assignment of a new task, it first queries the scheduling queue of its assigned cluster. If that scheduling queue contains one or more requests for execution, the next is assigned to the requesting instruction processor on a LIFO basis. This is deemed the normal situation when the system is under load, and results in affinity scheduling for enhancement of instruction processor execution.

If however, the scheduling queue of the cluster containing the requesting instruction processor is empty, that instruction processor makes a scheduling request of the scheduling queues of other clusters until either a task is found, or it is determined that all scheduling queues are empty. In this way, less efficient non-affinity scheduling events are accomplished to ensure optimal system loading whenever a cluster has no active scheduling requests. Whenever all scheduling queues are empty, it is acceptable to have instruction processors which are idling and unassigned.

Having thus describe the preferred embodiments in detail, those of skill in the art will be readily able to use the teachings found herein to make and use yet other embodiments within the scope of the claims appended hereto.

What is claimed is:

1. A data processing system containing a plurality of tasks, each of said plurality of tasks is associated with one of a plurality of scheduling queues, wherein the plurality of tasks for execution by a plurality of instruction processors, comprising:
    a plurality of clusters wherein each of said plurality of clusters is associated with one of said plurality of scheduling queues, wherein each of said plurality of instruction processors is assigned to one and only one of said plurality of clusters and each of said plurality of clusters has a plurality of instruction processors assigned to it and wherein each of said plurality of tasks can only be assigned to one of said plurality of instruction processors from said associated scheduling queue of each of said plurality of clusters; and
    a scheduling facility which assigns each of said plurality of tasks to one of said plurality of clusters based on a strict affinity of the association of the plurality of tasks and said scheduling queue.

2. The data processing system of claim 1 wherein each of said plurality of instruction processors is scheduled by said associated scheduling queue of said one and only one of said plurality of clusters to which it is assigned when said associated scheduling queue is not empty.

3. The data processing system of claim 2 wherein each of said plurality of instruction processors is scheduled by an associated scheduling queue of a different one of said plurality of clusters whenever said associated scheduling queue is empty.

4. The data processing system of claim 3 further comprising a video on demand system.

5. An apparatus comprising:
    a plurality of clusters;
    wherein each cluster includes a plurality of instruction processors;
    a plurality of tasks, each task is associated with one of a plurality of scheduling queues;
    wherein each cluster further includes one of the plurality of scheduling queues associated with the plurality of clusters, responsively coupled to each of said instruction processors included within said cluster and wherein only tasks assigned by said scheduling queue can be executed by said plurality of instruction processors;
    wherein said scheduling queue provides tasks to be assigned to said plurality of instruction processors included with said cluster; and
    a scheduling facility which assigns said tasks to each of said plurality of clusters based on a strict affinity of the association of the plurality of tasks and said scheduling queue.

6. An apparatus according to claim 5 wherein each of said plurality of instruction processors is further responsively coupled to each of said scheduling queue from each of said plurality of clusters.

7. An apparatus according to claim 6 further comprising a video on demand system.

8. An apparatus according to claim 7 wherein each of said instruction processors provide streaming of digital video programming.

9. An apparatus according to claim 8 wherein said scheduling queue of each of said plurality of clusters is stored within a memory.

10. A data processing system for processing of data comprising:
    a plurality of instruction processors arranged in a plurality of clusters wherein each of said plurality of clusters contains more than one instruction processor;
    a plurality of tasks, each task is associated with one of a plurality of queuing means;
    said plurality of queuing means for queuing said tasks to be scheduled, wherein each of said plurality of clusters has a single dedicated one of said plurality of queuing means which schedules said tasks for said plurality of instruction processors contained within each of said plurality of clusters and wherein none of said plurality of instruction processors can execute any task which is not assigned by one of said plurality of queuing means; and
    assigning means responsively coupled to said plurality of cluster for assigning tasks to each of said plurality of clusters based on a strict affinity of the association of the plurality of tasks and said queuing mean.

11. A data processing system according to claim 10 wherein said each of said plurality of instruction processors is responsively coupled to each of said plurality of task queuing means.

12. A data processing system according to claim 11 wherein each of said plurality of instruction processors further comprise means for streaming digital video programming.

13. A data processing system according to claim 12 further comprising means for storing data.

14. A data processing system according to claim 13 wherein said storing means stores each of said plurality of queuing means.

15. A method of scheduling a plurality of instruction processors with a data processing system comprising:
    assigning said plurality of instruction processors to a plurality of clusters such that each cluster has an assigned plurality of instruction processors and each instruction processor is assigned to only one cluster;
    establishing a scheduling queue for each of said plurality of clusters which schedules tasks to said assigned plurality of instruction processors;
    associating each task of a plurality of tasks with one of said plurality of scheduling queues; and
    assigning said tasks to each of said scheduling queues based on a strict affinity of the association of the plurality of tasks and said scheduling queue, and scheduling tasks for execution on said plurality of instruction processors only by said scheduling queue for each of said plurality of clusters.

16. A method according to claim 15 wherein one of said plurality of instruction processors is assigned a task from the scheduling queue of the cluster containing said one of said plurality of instruction processors.

17. A method according to claim 16 wherein said one of said plurality of instruction processors is assigned said task from said scheduling from another of said plurality of clusters if said scheduling queue of said cluster containing said one of said plurality of instruction processors is empty.

18. A method according to claim 17 wherein said task involves streaming a selected video program.

19. A method according to claim 18 wherein said scheduling from each of said plurality of clusters is stored within a single memory.

* * * * *